United States Patent
Weigand

(10) Patent No.: US 8,588,689 B2
(45) Date of Patent: *Nov. 19, 2013

(54) SYSTEMS AND METHODS FOR CONFIGURING SUBSCRIBER SYSTEMS IN WIRELESS MESH NETWORKS

(75) Inventor: Gilbert G. Weigand, Ashburn, VA (US)

(73) Assignee: Microsoft Corporation, Redmond, WA (US)

(*) Notice: Subject to any disclaimer, the term of this patent is extended or adjusted under 35 U.S.C. 154(b) by 94 days.

This patent is subject to a terminal disclaimer.

(21) Appl. No.: 13/211,196

(22) Filed: Aug. 16, 2011

(65) Prior Publication Data

US 2011/0299498 A1 Dec. 8, 2011

Related U.S. Application Data

(63) Continuation of application No. 12/561,770, filed on Sep. 17, 2009, now Pat. No. 8,005,511, which is a continuation of application No. 12/018,004, filed on Jan. 22, 2008, now Pat. No. 7,606,597, which is a continuation of application No. 10/414,434, filed on Apr. 15, 2003, now Pat. No. 7,395,067.

(60) Provisional application No. 60/372,146, filed on Apr. 15, 2002.

(51) Int. Cl.
*H04B 7/00* (2006.01)

(52) U.S. Cl.
USPC ...................................... 455/41.2; 455/562.1

(58) Field of Classification Search
USPC ...................................... 455/562.1, 41.2, 453
See application file for complete search history.

(56) References Cited

U.S. PATENT DOCUMENTS

| | | |
|---|---|---|
| 5,396,648 A | 3/1995 | Patsiokas et al. |
| 5,557,611 A | 9/1996 | Cappellari et al. |
| 5,579,367 A | 11/1996 | Raymond et al. |
| 5,832,363 A | 11/1998 | Moriya et al. |
| 5,889,494 A | 3/1999 | Reudik et al. |
| 5,946,296 A | 8/1999 | Kim et al. |
| 6,112,081 A | 8/2000 | Namura et al. |
| 6,112,092 A | 8/2000 | Benveniste |
| 6,118,763 A | 9/2000 | Trumbull |
| 6,122,255 A | 9/2000 | Bartholomew et al. |
| 6,141,565 A | 10/2000 | Feuerstein et al. |
| 6,208,863 B1 | 3/2001 | Saionaho |
| 6,222,823 B1 | 4/2001 | Smith et al. |
| 6,243,586 B1 | 6/2001 | McGuire |
| 6,282,194 B1 | 8/2001 | Cheesman et al. |
| 6,400,335 B1 | 6/2002 | Weaver et al. |
| 6,404,735 B1 | 6/2002 | Beshai et al. |
| 6,519,461 B1 | 2/2003 | Andersson et al. |
| 6,731,905 B2 | 5/2004 | Ogino et al. |
| 6,751,193 B1 | 6/2004 | Kudrimoti et al. |

(Continued)

OTHER PUBLICATIONS

"Notice of Allowance", U.S. Appl. No. 13/235,692, (Sep. 4, 2012), 4 pages.

(Continued)

*Primary Examiner* — Creighton Smith
(74) *Attorney, Agent, or Firm* — Wolfe—SBMC

(57) ABSTRACT

A wireless network may be managed by identifying one or more wireless subscriber systems included in a lobe pool of a wireless network, identifying at least one candidate subscriber system outside of the lobe pool with which to enable communications, and reconfiguring the antenna such that the lobe pool includes the identified candidate subscriber system.

27 Claims, 9 Drawing Sheets

(56) References Cited

U.S. PATENT DOCUMENTS

| | | |
|---|---|---|
| 6,778,500 B1 | 8/2004 | Vileid et al. |
| 6,785,510 B2 | 8/2004 | Larsen |
| 6,785,511 B1 | 8/2004 | Hengeveld et al. |
| 6,829,491 B1 | 12/2004 | Yea et al. |
| 6,990,313 B1 | 1/2006 | Yarkosky |
| 7,031,722 B2 | 4/2006 | Naghian |
| 7,151,938 B2 | 12/2006 | Weigand |
| 7,363,003 B2 | 4/2008 | Takatani |
| 7,386,274 B2 | 6/2008 | Weigand |
| 7,395,067 B2 | 7/2008 | Weigand |
| 7,508,801 B1 | 3/2009 | Calhoun et al. |
| 7,606,597 B2 | 10/2009 | Weigand |
| 7,725,110 B2 | 5/2010 | Weigand |
| 7,962,094 B2 | 6/2011 | Weigand |
| 8,005,511 B2 | 8/2011 | Weigand |
| 8,023,957 B2 | 9/2011 | Weigand |
| 8,346,273 B2 | 1/2013 | Weigand |
| 2001/0036810 A1 | 11/2001 | Larsen |
| 2002/0028679 A1 | 3/2002 | Edwards et al. |
| 2002/0032031 A1 | 3/2002 | Ogino et al. |
| 2002/0086682 A1 | 7/2002 | Naghian |
| 2003/0119558 A1 | 6/2003 | Steadman et al. |
| 2004/0009792 A1 | 1/2004 | Weigand |
| 2004/0014471 A1 | 1/2004 | Weigand |
| 2004/0014491 A1 | 1/2004 | Weigand |
| 2007/0149207 A1 | 6/2007 | Weigand |
| 2008/0039089 A1 | 2/2008 | Berkman et al. |
| 2008/0304436 A1 | 12/2008 | Weigand |
| 2009/0116444 A1 | 5/2009 | Wang |
| 2009/0117893 A1 | 5/2009 | Weigand |
| 2010/0008263 A1 | 1/2010 | Weigand |
| 2010/0315966 A1 | 12/2010 | Weigand |
| 2011/0228677 A1 | 9/2011 | Weigand |
| 2012/0057485 A1 | 3/2012 | Weigand |
| 2013/0210473 A1 | 8/2013 | Weigand |

OTHER PUBLICATIONS

Notice of Allowance in U.S. Appl. No. 11/561,163 dated Jan. 28, 2010 (14 pages).

International Search Report in International Application No. PCT/US03/11446 mailed Nov. 20, 2003.

"Final Office Action", U.S. Appl. No. 12/561,770, (Jan. 5, 2011), 4 pages.

"Non-Final Office Action", U.S. Appl. No. 10/414,433, (Mar. 20, 2006), 17 pages.

"Non-Final Office Action", U.S. Appl. No. 10/414,434, (May 14, 2007), 5 pages.

"Non-Final Office Action", U.S. Appl. No. 10/414,435, (May 21, 2007), 4 pages.

"Non-Final Office Action", U.S. Appl. No. 10/414,435, (Aug. 30, 2007), 5 pages.

"Non-Final Office Action", U.S. Appl. No. 12/135,909, (Sep. 24, 2010), 4 pages.

"Non-Final Office Action", U.S. Appl. No. 12/561,770, (Sep. 26, 2010), 4 pages.

"Non-Final Office Action", U.S. Appl. No. 12/780,153, (Dec. 28, 2010), 5 pages.

"Non-Final Office Action", U.S. Appl. No. 13/235,692, (Apr. 9, 2012), 5 pages.

"Notice of Allowance", U.S. Appl. No. 10/414,433, (Jul. 28, 2006), 4 pages.

"Notice of Allowance", U.S. Appl. No. 10/414,434, (Sep. 18, 2007), 4 pages.

"Notice of Allowance", U.S. Appl. No. 10/414,435, (Feb. 4, 2008), 6 pages.

"Notice of Allowance", U.S. Appl. No. 11/561,163, (Jan. 28, 2010), 8 pages.

"Notice of Allowance", U.S. Appl. No. 12/018,004, (Jun. 17, 2009), 6 pages.

"Notice of Allowance", U.S. Appl. No. 12/135,909, (Feb. 4, 2011), 6 pages.

"Notice of Allowance", U.S. Appl. No. 12/561,770, (Apr. 14, 2011), 7 pages.

"Notice of Allowance", U.S. Appl. No. 12/780,153, (May 13, 2011), 5 pages.

"Non-Final Office Action", U.S. Appl. No. 13/117,263, (Apr. 18, 2013), 4 Pages.

"Non-Final Office Action", U.S. Appl. No. 13/730,282, (Jun. 6, 2013), 5 pages.

"Notice of Allowance", U.S. Appl. No. 13/117,263, (Aug. 5, 2013), 7 pages.

"Supplemental Notice of Allowance", U.S. Appl. No. 13/117,263, (Sep. 12, 2013), 2 pages.

SYSTEMS AND METHODS FOR CONFIGURING SUBSCRIBER SYSTEMS IN WIRELESS MESH NETWORKS

CROSS-REFERENCE TO RELATED APPLICATIONS

This application is a continuation of U.S. application Ser. No. 12/561,770, filed Sep. 17, 2009 now U.S. Pat. No. 8,005,511(allowed), which is a continuation of U.S. application Ser. No. 12/018,004, filed Jan. 22, 2008(now U.S. Pat. No. 7,606,597), which is a continuation of U.S. application Ser. No. 10/414,434, filed Apr. 15, 2003(now U.S. Pat. No. 7,395,067), which claims the benefit of priority U.S. Provisional Application No. 60/372,146, filed Apr. 15, 2002. All of the above applications are incorporated herein by reference.

TECHNICAL FIELD

This document relates to wireless networks.

BACKGROUND

The growth of digital networks and the rich content accessible on such networks enables many users from varying environments to communicate and access information they never imagined.

SUMMARY

In one general sense, a wireless network may be managed by identifying one or more wireless subscriber systems included in a lobe pool of a wireless network, identifying at least one candidate subscriber system outside of the lobe pool with which to enable communications, and reconfiguring the antenna such that the lobe pool includes the identified candidate subscriber system.

Implementations may include one or more of the following features. The lobe pool may include an aggregated communications region covered by more than one wireless device acting collectively.

At least one candidate subscriber system outside of the lobe pool may be identified by polling subscriber systems within the lobe pool to determine other potential configurations for the subscriber systems, and identifying as the candidate subscriber systems subscribers systems that are leveraged by the potential configurations and outside the lobe pool.

Alternatively, one or more wireless subscriber systems may be identified by determining a location for each of several subscriber systems, and determining a geographic proximity between the wireless subscriber systems and a wireless base station based on their locations, and identifying a subset of the wireless subscriber systems as being included in the lobe pool based on their determined geographic proximity. Or, one or more wireless subscriber systems may be identified by developing a network profile for each of several subscriber systems and identifying a subset of the subscriber systems as being included in the lobe based on their network profiles.

The candidate subscriber system may be identified by determining a wireless network configuration that reduces congestion in the wireless network, and identifying as candidate subscriber systems wireless subscriber systems that are leveraged by the wireless network configuration and that are outside the lobe pool.

The antenna may be reconfigured to exclude one or more wireless subscriber systems that were included in a lobe pool prior to reconfiguring the antenna. The antenna may be reconfigured mechanically or electronically such that the lobe pool includes the identified candidate subscriber system. The antenna also may be reconfigured by transmitting a stronger signal to reach additional subscriber systems that are located a distance from the antenna that is greater than a farthest subscriber system that is both included in the lobe pool and oriented with respect to the antenna in a direction defined by an axis between the antenna and the candidate subscriber system.

The antenna may be reconfigured by activating a new antenna such that the lobe pool is expanded to include an aggregated communications region covered by at least the antenna and the new antenna, or by reorienting an alternative antenna that is serving an alternative lobe pool to address a variation, thereby transferring one or more subscriber systems in the lobe pool to the alternative lobe pool. Transferring the subscriber systems may include configuring the transferred wireless subscriber systems to join the alternative lobe pool.

The operations of identifying one or more wireless subscriber systems, identifying at least one candidate subscriber system, and reconfiguring the antenna may be performed in a centralized manner on a centralized first device that generates configuration information and transmits the configuration information to a device used to reconfigure the antenna; or they may be performed in a distributed manner on multiple subscriber systems, where one or more of the subscriber systems transmit updates to a base station to reorient the antenna; or they may be performed on a wireless base station and/or on the identified candidate subscriber system. Transmitting the configuration information to a second device may include transmitting the configuration information to the wireless subscriber systems, which may include the identified candidate subscriber system.

In another general sense, a wireless network may be managed by identifying subscriber systems for which a directional antenna is capable of enabling communications, and identifying a subset of the subscriber systems. The subset may include subscriber systems included in a current lobe pool of the directional antenna for which communications are enabled when the subset is identified. At least one candidate subscriber system may be identified for which communications are desired, the candidate subscriber system being among the subscriber systems for which the directional antenna is capable of enabling communications and outside the subset of subscriber systems included in the lobe pool of the directional antenna when the subset is identified. The directional antenna may be reoriented to include the candidate subscriber system in the lobe pool.

These and other aspects may be implemented by a system and/or by a computer program stored on a computer readable medium such as a disc, a client device, a host device and/or a propagated signal. The system may include a wireless subscriber system, a wireless controller, a wireless base station, or an identified candidate subscriber system.

As such, details of one or more implementations are set forth in the accompanying drawings and the description below. Other features will be apparent from the description and drawings, and from the claims.

DETAILED DESCRIPTION

Figure 1:
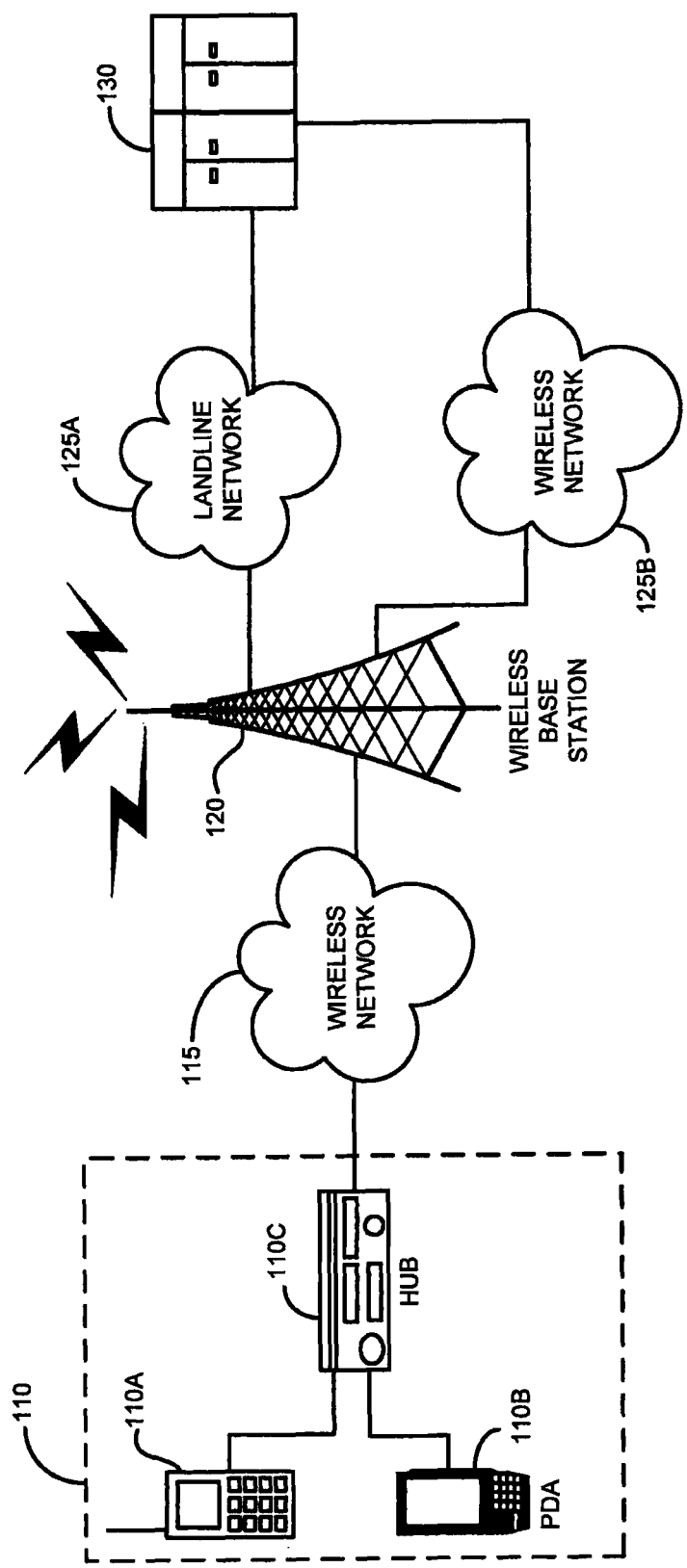
FIG. 1 is a block diagram of an exemplary communications system in which a subscriber system uses a wireless network to access a host.

A wireless network may include multiple subscriber systems and base stations. The subscriber systems may be configured such that one subscriber system may use one or more other subscriber systems to reach a destination or intermediary base station. Depending on the state of the wireless network, the operating environment, and the configuration of the subscriber systems and base stations, the wireless network may be reconfigured to accommodate the changing state of the wireless network.

In one example, in response to increased network congestion generated by subscriber activity, the wireless network may be reconfigured by accessing additional or less congested paths to enable the wireless networks to reach a base station or regional gateway (e.g., a wireless base station operated by a service provider).

In another example, reconfiguration may occur in response to changing meteorological conditions that affect the wireless transmission media. For instance, a thunderstorm may create a lossy environment that reduces the transmission range of participating systems. Wireless network reconfiguration may enable accommodation of an increased subscriber density as each lobe is smaller, creating less interference with other systems while requiring more relays as some lobes may not be able to accommodate subscriber systems that are now beyond their range.

The wireless network may be reconfigured in a variety of manners. In one example, the lobes of participating systems (e.g., subscriber systems and base stations) may be redirected, for example, in different directions. Alternatively, or in addition to directionally changing the subscriber system, a lobe's amplitude may be attenuated, that is, increased or decreased. A subscriber system may be configured to act as a relay for other subscriber systems. A subscriber system may elect to stop participating in one network and begin to participate in another network. This may be done by activating another antenna or redirecting an existing lobe. The wireless network also may reconfigure communications parameters within a channel or network. For example, bandwidth may be reallocated or reprioritized.

Before describing particular examples using FIGS. 1-7, the operations of a wireless network are briefly described using an illustrative and simplified network having one base station initially supporting two subscriber systems. For purposes of this illustration, the wireless base station supports the two subscriber systems in a lobe that has 100 kilobits/second of capacity, the wireless base station ordinarily/initially being configured to reserve 10 kilobits/second for administrative requirements and to divide the remaining bandwidth among the supported subscriber systems such that each has 45 kilobits/second of bandwidth available.

In keeping with the illustration, it is assumed that a thunderstorm moves into the area or some other event occurs to adversely affect the wireless network and reduce the available bandwidth from 100 kilobits/second to 50 kilobits/second. In response, the wireless base station changes its bandwidth allocation. For instance, it may apportion the decrease in bandwidth to each or selected of the current channels, evenly or disproportionately, may reduce the administrative channel from 10 kilobits/second to 5 kilobits/second and the user channels from 45 kilobits/second to 22.5 kilobits/second. As the thunderstorm leaves the area (or the other event is resolved) and the quality of the transmission medium improves gradually or abruptly, so too may the bandwidth be increased or otherwise returned to its ordinary levels, gradually or abruptly as appropriate.

As or after the wireless network returns to its normal 100 kilobit/second capacity, another event may occur that requires the channel to be reconfigured. For example, when a third subscriber system joins the wireless network, the two 45-kilobit channels may be reallocated into three 30-kilobit channels. If the third subscriber system was requesting delay-sensitive media (e.g., a live broadcast), the channels may be further reallocated to accommodate the increased demand by delaying particular time insensitive or less urgent transmissions from the first or second subscriber system or by reducing the bandwidth allocated to first or second subscriber system altogether, for example, to 10 kilobits per second.

As the requirements of the third subscriber system increase or last beyond a specified length, the first, second, or third subscriber system may elect to reconfigure its lobe to cease participating in the illustrated network and join another network. The other network may enjoy greater capacity than the first network. And, in one example, the other network may be accessed through/via another subscriber system that acts as a relay to access a different lobe of the same base station. Thereafter, as the state of the wireless network changes, the reconfigured subscriber system may rejoin the example network.

Referring to FIG. 1, a wireless network 100 is shown. The wireless network 100 enables access between a subscriber system 110 and the host 130 through a wireless base station 120. Specifically, the subscriber system 110 may use a wireless network 115 that interfaces with a wireless base station 120 to access the host 130 (e.g., an electronic mail server).

The subscriber system 110 may include one or more devices capable of accessing content on the host 130. The subscriber system 110 may include a controller (not independently shown) that processes instructions received from or generated by a software application, a program, a piece of code, a device, a computer, a computer system, or a combination thereof, which independently or collectively direct operations of the subscriber system 110. The instructions may be embodied permanently or temporarily in any type of machine, component, equipment, storage medium, or propagated signal that is capable of being delivered to the subscriber system 110 or that may reside with the controller at subscriber system 110. The subscriber system 110 may include a client system, such as a wireless phone 110A, a PDA 110B, or a workstation (not shown). In addition, subscribe system 110 may include a hub 110C that provides the client system with access to the wireless network 115. In one example, the hub 110C includes a set top box or home networking device that aggregates network connections within a home. The set top box then may interface with a wireless system and antenna (perhaps residing in a different location) to interface with the wireless network 115.

The subscriber system 110 may include one or more information retrieval software applications (e.g., a browser, a mail application, an instant messaging client, an Internet service provider client, or another integrated client) capable of receiving one or more data units. The information retrieval software applications may run on a general-purpose operating system and a hardware platform that includes a general-purpose processor and specialized hardware for graphics, communications and/or other capabilities. The subscriber system 110 also or alternatively may include a wireless telephone running a micro-browser application on a reduced operating system with general purpose and specialized hardware capable of operating in mobile environments.

The subscriber system 110 may run one or more applications or code segments enabling communications with/over the wireless network 115. For example, the subscriber system 110 may run one code segment that monitors the state of the communications medium to detect changing atmospheric conditions that may adversely affect the communications capability of the subscriber system 110, which state information medium may be used to reduce congestion by reconfiguring the wireless network. In another example, the subscriber system 110 may be running routing software that maintains the wireless network topology so that the wireless network may access a path, link, or channel to exchange information.

The subscriber system 110 may be distributed across multiple devices. For example, the subscriber system 110 may reside in a wireless controller, a modem, and a personal computer.

Wireless network 115 includes one or more access systems/techniques that do not require a fixed transmission medium, such as a cable or a wire to exchange information. For example, the wireless network 115 may exchange messages in a specified portion of the spectrum (e.g., 2.5 or 5 Ghz) using a specified format (e.g., 802.11(b)). The wireless network 115 may use free space (e.g., the atmosphere) to exchange information between participating communications systems. Furthermore, the wireless network 115 may use free space that forms a channel. For example, the wireless network 115 may take advantage of transmission channels that exist between boundaries of the atmosphere (e.g., tropospheric or atmospheric scatter-based communications).

The wireless network 115 may be described by one or more transmission parameters that describe the quality or nature of communications through the medium. The wireless network 115 may be described in relation to the loss of the medium, the bandwidth and the frequency used, the communications range/distance, and/or the electromagnetic profile or lobe for participating systems.

The wireless network 115 may use multiple communications formats or frequencies. For example, a wireless network may participate in both 802.11(a) and 802.11(b) networks.

Subscriber systems in the wireless network 115 typically use an antenna to participate in the wireless network. The antenna has an associated area of coverage. This area of coverage may represent an area within which other devices may be located in order to use the antenna to send and/or receive communications with a subscriber system of interest. Depending on the configuration of the antenna and subscriber system, the lobe may differ with respect to varying parameters including its area, shape, and/or range.

When multiple subscriber systems participate collectively in a wireless network, the collective areas that may exchange information in the wireless network may be referred to as a lobe pool. Generally, the lobe pool represents the aggregation of lobes established by/for the individual subscriber systems. Thus, the lobe of a new wireless communication or subscriber system that joins the wireless network contributes to the lobe pool of the wireless network, and the lobe of a subscriber system removed from the wireless network no longer contributes to the lobe pool of the wireless network. Joining the lobe pool may be performed by relocating the new device so that it resides in the lobe pool, reconfiguring the lobe pool by reorienting an antenna of an existing subscriber system in the lobe pool to reach the new subscriber system, and/or enabling a lobe of the new subscriber to reach other subscriber systems in the lobe pool. Although the lobe pool has been described in the context of wireless subscriber systems, a base station and its lobes also may form part of the lobe pool.

The configuration and/or size of the lobe pool may be regulated so that performance is not adversely affected as the wireless network changes. For example, as the size of the lobe pool grows, the demand on subscriber systems also may grow and impact the ability of the subscriber systems to participate in the lobe pool. The lobe pool may be reconfigured as the size, population, and/or network changes to maintain the lobe pool in a desired operating range.

Wireless base station 120 enables one or more subscriber systems to interface with one or more hosts 130 through the wireless network 115. The wireless base station 120 may access the host 130 using a landline network 125A that may or may not share software and componentry with wireless network 125B. Generally, the landline network 125A describes a transmission medium and format that uses a fixed physical infrastructure. For example, the landline network 125A may include an ATM ("Asynchronous Transfer Mode") WAN ("Wide Area Network") operated over a fiber optic cable plant. The landline network 125A also may include, but is not limited to, telephone-based circuits (e.g., a T-1, a DS-3), ISDN ("Integrated Services Digital Networks"), or Ethernet protocols tied to fixed infrastructure (e.g., 100 Base T for Ethernet at 100 Mbps over copper cables).

Alternatively, the wireless base station 120 may access the host 130 using a combination of a wireless network 125B and a landline network 125A. For example, a first wireless base station 120 may use a second wireless base station as a relay to access landline networks leading to a host 130.

The wireless base station 120 may include one or more directional antennas to enable the wireless base station to sectorize different lobes to allocate an appropriate amount of bandwidth to subscriber system 110. For example, a wireless base station 120 may use nine (9) antennas, each with 45 degrees of coverage from the wireless base station 120.

A greater or lesser number of antennas may be used to sectorize a complete region (e.g., 360 degrees) with different sized lobes (e.g., ten (10) antennas, at 36 degrees each). Furthermore, a region may be partially sectorized (e.g., 270 degrees of interest) within a region, or there may be different sectorizations for different sub regions within a region of interest (e.g., a 180 degree sub region with dense subscriber population may be sectorized with smaller lobes than 180 degree sub region corresponding to sparse subscribe population).

To illustrate, a base station may include five (5) antennas that may collectively support five (5) different lobes. For each antenna, the direction of focus may be controlled so that the antenna's lobe is oriented to serve a desired subscriber system community. Thus, if the base station were situated on the boundary of a region between a dense subscriber population and a sparse subscriber population, the base station may use less than all of the five (5) antennas to support the sparse subscriber population for a subset of the 360 degrees of the base station, and the remaining portion of the 360 degrees may be apportioned appropriately among the remaining number or less than the remaining number of antennas. More particularly, by way of example, if one antenna were configured to cover the sparsely populated region over 160 degrees, the other remaining four (4) antennas may be assigned to support smaller, more densely populated subscriber regions, with each of the lobes supporting 50 degrees/antenna or different allocations. In this example, the remaining 200 degrees also may have been apportioned among fewer than the remaining four (4) antennas, enabling focus of gain among other things.

Sectorization may allow different subscriber systems 110 to operate in the same frequency without interference (e.g., contending for the same bandwidth) if different lobes are provided at the wireless base station 120. Sectorization also may be useful in increasing the range of a wireless base station 120.

For example, instead of distributing the electromagnetic energy across a wide arc, the electromagnetic energy could be focused into a narrower region of interest. Focusing the lobes may allow more lobes to be collocated in the same general area.

Host 130 may include one or more devices structured and arranged to provide services and/or data to clients (e.g., subscriber system 110). One example of a host 130 is a general-purpose computer (e.g., a server) capable of responding to and executing instructions in a defined manner. Other examples include a personal computer, a special-purpose computer, a workstation, a device, a component, other equipment, or some combination thereof capable of responding to and executing instructions. The host 130 may include and/or form part of an information delivery network, such as, for example, the Internet, the World Wide Web, an online service provider, and/or any other analog or digital wired and/or wireless network that provides information. Such information delivery networks may support a variety of online services, including Internet and/or web access, e-mail, instant messaging, paging, chat, interest groups, audio and/or video streaming, and/or directory services.

The host 130 may receive instructions from a software application, a program, a piece of code, a device, a computer, a computer system, or a combination thereof that independently or collectively directs operations of the node. The instructions may be embodied permanently or temporarily in any type of machine, component, equipment, storage medium, or propagated signal that is capable of being delivered to the host 130.

Figure 2:
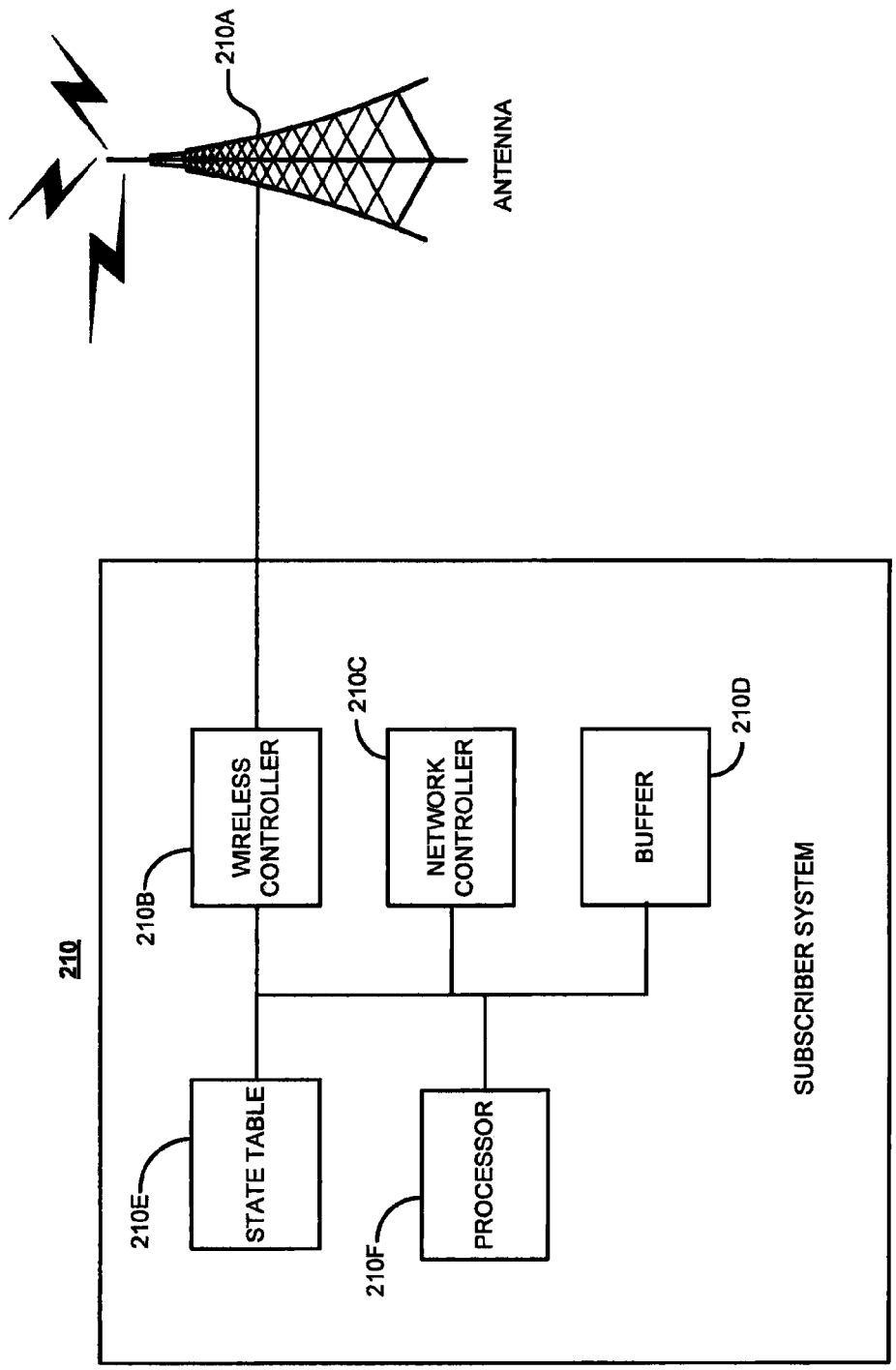
FIG. 2 is a block diagram of a subscriber system.

Referring to FIG. 2, a block diagram of a subscriber system 210 is shown. Generally, aspects of the subscriber system 210 correspond to aspects of the subscriber system 110 shown in FIG. 1. The subscriber system 210 includes an antenna 210A, a wireless controller 210B, a network controller 210C, a buffer 210D, a state table 210E, and a processor 210F. In general, the subscriber system 210 uses the wireless controller 210B, the network controller 210C and/or the processor 210F to interface with a wireless network (e.g., wireless network 115 in FIG. 1), enabling it to respond to changing network conditions so that resources may be efficiently allocated.

More particularly, antenna 210A is configured and may include related circuitry to enable the subscriber system 210 to transmit and receive electromagnetic signals in a specified portion of the RF (Radio Frequency) spectrum, for instance, the 2.5 Ghz spectrum used by the 802.1 lb protocol and/or the 5 Ghz spectrum used by the 802.11a protocol. The antenna 210A may include an omnidirectional (e.g., a uniform lobe) configuration with uniform gain in all directions, or alternatively, a non-uniform lobe, such as an array.

The related circuitry may include DSPs (Digital Signal Processors) that reduce noise and intelligently filter received signals. The related circuitry also may include one or more tuning circuits which may be modulated or multiplexed with a data signal to send or receive data.

The modulating circuits may combine an information signal with a carrier signal around which the transmitted wireless signal is based. Depending on the wireless protocol or format that is used, the information may be distributed in varying manners around the carrier signal. For example, the spectrum used by a FSK-based (Frequency Shift Keying-based) system may vary with the particular data being transmitted.

The antenna 210A may use one or more configurations to provide directional gain. By providing an antenna with directional gain, that is, a lobe with a higher gain in some directions than others, a network of subscribing systems 210 may coordinate synchronization of lobes. For example, in a network with a high density of subscriber systems 210, the lobes may be adjusted to minimize interference. A wireless network controller may identify which subscriber systems would be affected by a particular antenna orientation/configuration. The antenna's lobe then may be attenuated to support the desired subscriber system while subscriber systems designated to be outside of the lobe (or lobe pool) would be beyond the range or orientation of the lobe's configuration.

The lobe configuration may be configured relative to the configuration of the other lobes in the wireless network. For example, upon determining that the configuration of a lobe would affect a neighboring lobe, both lobes may be reconfigured to better distribute the relative bandwidth demand. A demanding user may be moved from a first lobe to a second lobe.

The lobes may be synchronized in a variety of manners. In one example, a lobe may be adjusted until other wireless systems (e.g., a base station or a subscriber system) are impacted by the adjustment. Upon reaching the impact threshold, the wireless system may "fall back" slightly until the reconfiguration no longer impacts the other wireless systems. The impact threshold may be defined such that only a severe or adverse impact forces the lobe to fall back.

The lobes may be synchronized by creating a topology of lobes and coordinating the configuration of the lobes. For example, a map may be created that includes the base station, the subscriber systems, and the lobes of the base stations and/or subscriber systems. The map then may be analyzed to identify congested regions. Systems associated with the congested regions then may be reconfigured to minimize the congestion. For example, a congested lobe may be reconfigured into smaller, less-congested nodes.

In one case, a first subscriber system may be structured and arranged to adjust its lobe and connect to a different wireless base station to avoid contending for bandwidth with other subscribing systems. In another example, two or more subscribing systems may synchronize their lobes so that a first subscribing system may act as a relay for the second subscribing system to reach a wireless base station.

The antenna 210A may be electronically tunable, with directional gain that may be controlled by altering the phase.

Additionally or alternatively, the antenna 210A may be mechanically tunable, such that the lobe orientation may be changed mechanically. For example, the antenna 210A may be coupled to a motor that changes its physical direction.

In yet another alternative, the antenna 210A may include two or more independent yet cooperative antennas oriented in different directions. The wireless controller 210B may selectively activate or focus or focus upon one or more of the several antennas to establish connections as required. For example, where the subscriber system acts as a relay, one antenna/lobe may be directed to the wireless base station while another antenna may be directed to subscriber systems acting as relays.

Configured as described, the antenna 210A may itself act as a relay for subscriber systems.

The wireless controller 210B may include a processor that enables the subscriber system 210 to use the antenna 210A to communicate with other devices. In general, the wireless controller 210B manages the wireless interface and may change the wireless mode and operation in response to changing wireless and network conditions. For example, if the wireless controller 210B detects that one network 'path' (e.g., one of the antenna's available lobes) is experiencing noise and/or transmission difficulties, the wireless controller 210B may reconfigure the antenna 210A to alter the lobe so that a different path may be used to communicate.

The wireless controller 210B may use CSMA/CD ("Carrier Sense Multiple Access/Collision Detect") (e.g., Ethernet) techniques, scheduling schemes, TDMA ("Time Division Multiple Access") techniques, CDMA ("Code Division Multiple Access") techniques and/or token passing schemes to allocate bandwidth. Generally, a CSMA/CD system operates so that one device may transmit when no other devices are transmitting. In scheduling schemes, the nodes negotiate for a designated channel in the spectrum. In CDMA, a code-modulating scheme is used to specify which frequencies are presently unavailable (e.g., currently used for transmission), while in a token passing scheme, the nodes negotiate for the token. When a node has the token, the node then may transmit.

The network controller 210C is structured and arranged to control the interface to the wireless network 115. Typically, controlling the network interface involves monitoring the state of a connection, link, path, and/or network so that the subscriber system 210 may dynamically respond to network conditions and events. Controlling the network interface also generally involves responding to or acting upon monitored conditions in an attempt to improve the performance of one or more subscriber systems 210. For example, the subscriber system 210 may be involved in downloading a large file. Depending on the nature of the file, the network controller 210C may control the download to compensate for the network conditions and take advantage of download requirements to optimize the performance for the wireless network. More particularly, if the download is a VOD (Video-on-demand) file, the network controller 210C may interface with the wireless base station and other subscriber systems so that the subscriber system 210 receives guaranteed performance and/or increased bandwidth. In another example, if the downloaded file is non-critical or not time-sensitive, the network controller may interface with the wireless base station and/or other subscriber systems so that other transmissions may receive priority relative to the non-critical download.

Although the wireless controller 210B and the network controller 210C are described separately, implementations may include situations where either or both controllers provide information to enable coordinated communications. For example, the wireless controller 210B may exchange state information relating to RF transmission patterns, noise, interference, signal strength, and the presence of other devices with the network controller 210C to determine how to route the data. Similarly, the network controller 210C may provide transmission requirements to the wireless controller 210B to interface with the wireless base station 120 to allocate more bandwidth.

The buffer 210D may include memory that stores data for transmission or receipt. For example, if the subscriber system 210 is acting as a relay for other subscriber systems, its buffer 210D may store buffer information received from one subscriber system received on one channel, and then may transmit the stored information on a second channel to the wireless base station 120 to effect redirection of that information as a relay.

The state table 210E may include memory that tracks the state of other devices participating in the wireless network 100. In one implementation, the subscriber system 210 periodically polls other devices in the wireless network 100 for availability. For example, the subscriber system may periodically ping ("packet Internet gopher") other devices in the same network. The response times may be used to gauge the quality of the wireless network 100 and/or channel as well as the state of the connection between two nodes in the wireless network 100. For example, in a set of four (4) pings from a first node to a second node, two (2) of the requests may be dropped while the other two (2) requests may receive a response in four (4) ms, indicating that the first and second nodes might be close geographically (hence the four (4) ms response), but that congestion is preventing the other nodes from responding (hence, the dropped response).

The state table 210E may be updated using other operations. For example, the subscriber systems may send periodic updates to a management station. These updates then may be correlated to describe the state of the wireless network. For example, if the updates include a traffic utilization metric, the updates may be used to identify which portion of the wireless network is experiencing congestion. This congestion may be localized to a particular subscriber system, condition, event, or lobe pool. The state table 210E then may be used to prepare the response to the source of the congestion or interruption.

The state table may be associated with a central management configuration, a distributed configuration, or a hybrid configuration. A central management configuration describes a wireless network configuration where updates and information may be collected by a management agent. The management agent then may task, distribute, or reconfigure other systems accordingly. In a distributed configuration, each participating subscriber system is configured to determine a configuration for itself and act accordingly. For example, a subscriber system may be configured to exchange information with other subscriber systems. The subscriber system then may use the exchanged information to structure communications.

A distributed configuration describes a state table 210E that may provide some hierarchical collection and also enables the subscriber systems to decide a range of activities for themselves. In one example of a hybrid configuration, the state table 210E may be built on a central management system. The configuration then may be "pushed" to the subscriber systems (or a base station) so that the subscriber system may make local decisions based on localized events. In one example, the central management system may provide a "master configuration" and enable the subscriber system to operate within an identified range. For example, the subscriber system may be allowed to transmit a maximum of 1 Mbps unless the subscriber system is acting as a relay, in which case the subscriber system may transmit at 4 Mbps.

The state table 210E also may be used to maintain a topology of the wireless network 100, or a sub portion thereof. For example, a collection of subscriber systems 210 and base stations 120 may be running a routing protocol with updates to determine how a subscriber system 210 should communicate with one or more exterior gateways (e.g., an Internet access point). This routing protocol may include both networking and wireless access considerations. For example, if two paths form an equal cost, but one of the nodes is a subscriber system 210, while the other system is a base station 120, the wireless base station 120 may be 'preferred', all other things equal.

The processor 210F may be structured and arranged to integrate one or more functions across the subscriber system 210. Additionally, the processor 210F typically may enable one or more other applications. For example, the subscriber system 210 may include a set top box used by a consumer for Internet access on a television. The set top box may include the functions described above to access a wireless network 100, in addition to programs for instant messaging, electronic mail, and Web browsing. The set top box also may serve as a residential gateway. In one such implementation, the set top box may enable other computers to access the set top box as a relay for broadband access. In another example, home appliances may access the set top box to enhance home automation. Furthermore, the set top box may use the wireless network 100 that is accessed to provide cable or other functionality. For example, the wireless base station may use multicasts to provide services resembling satellite or cable television.

Although the processor 210F is shown as being distinct from the network controller 210C, aspects of the processor 210F and the network controller 210B may be shared. For example, aspects of the network controller 210C may be implemented in specialized hardware (e.g., ASICs (Application Specific Integrated Circuit)) to perform frame and packet processing, while a general-purpose processor 210F provides access to user applications (e.g., email) and also calculating routing updates.

Figure 3:
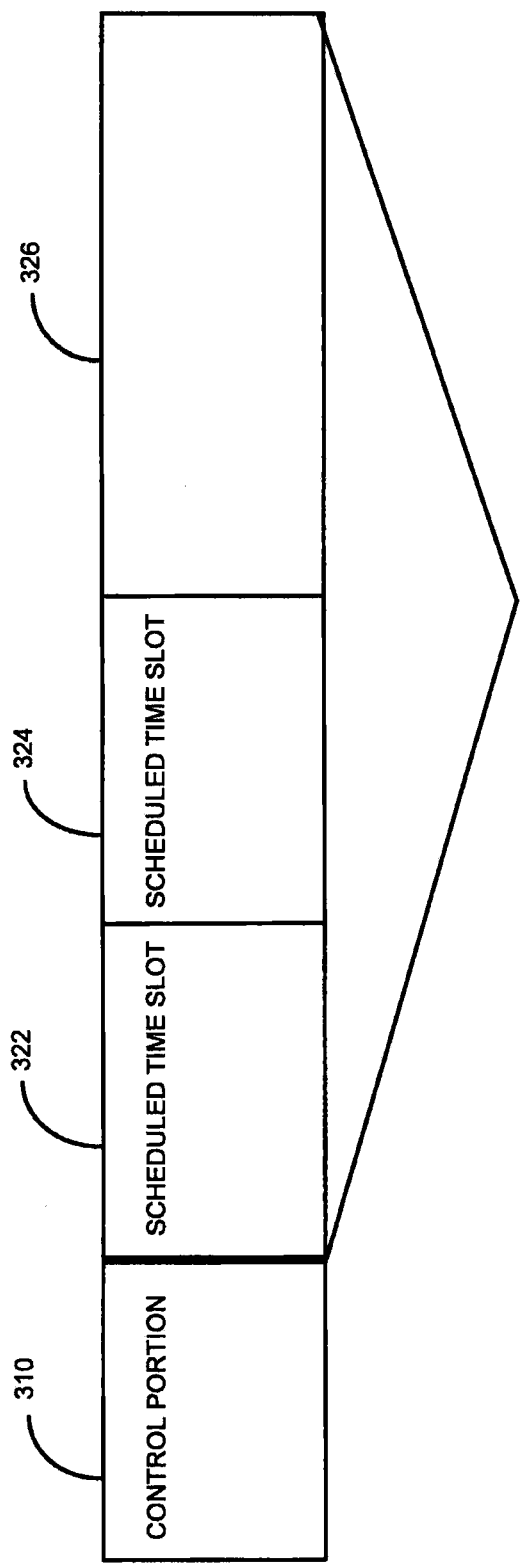
FIG. 3 illustrates a bandwidth allocation scheme enabling multiple subscriber systems to access a wireless network.

Referring to FIG. 3, a scheduling scheme 300 illustrates how three nodes (e.g., subscriber systems such as those shown at reference numerals 110 and 210 and described with respect to FIGS. 1 and 2) in a network may communicate over a single lobe in a coordinated manner according to one exemplary scheduling scheme.

Using the bandwidth allocated to the control portion 310, the devices exchange state information that will enable a determination of the state of communications or network capacity/health, and thus govern allocation of bandwidth within at least the data exchange portion 320. For example, using the control portion 310, other devices may be pinged to determine network responsiveness. In another example, the subscriber systems may send rating updates (e.g., an OSPF ("Open Shortest Path First") Hello). In yet another example, the subscriber systems may negotiate with a wireless base station controller for bandwidth guarantees.

As is shown the FIG. 3 example, the data exchange portion 320 is divided into three channels, 322, 324 and 326. Each of the nodes receives its own channel. As is represented by channel 326, device C receives prioritization and is allowed more bandwidth than nodes A or B, as is indicated by the longer time that is allowed for transmission. In this manner, devices may be scheduled to transmit so that they do not interfere with each other.

Figure 3A:
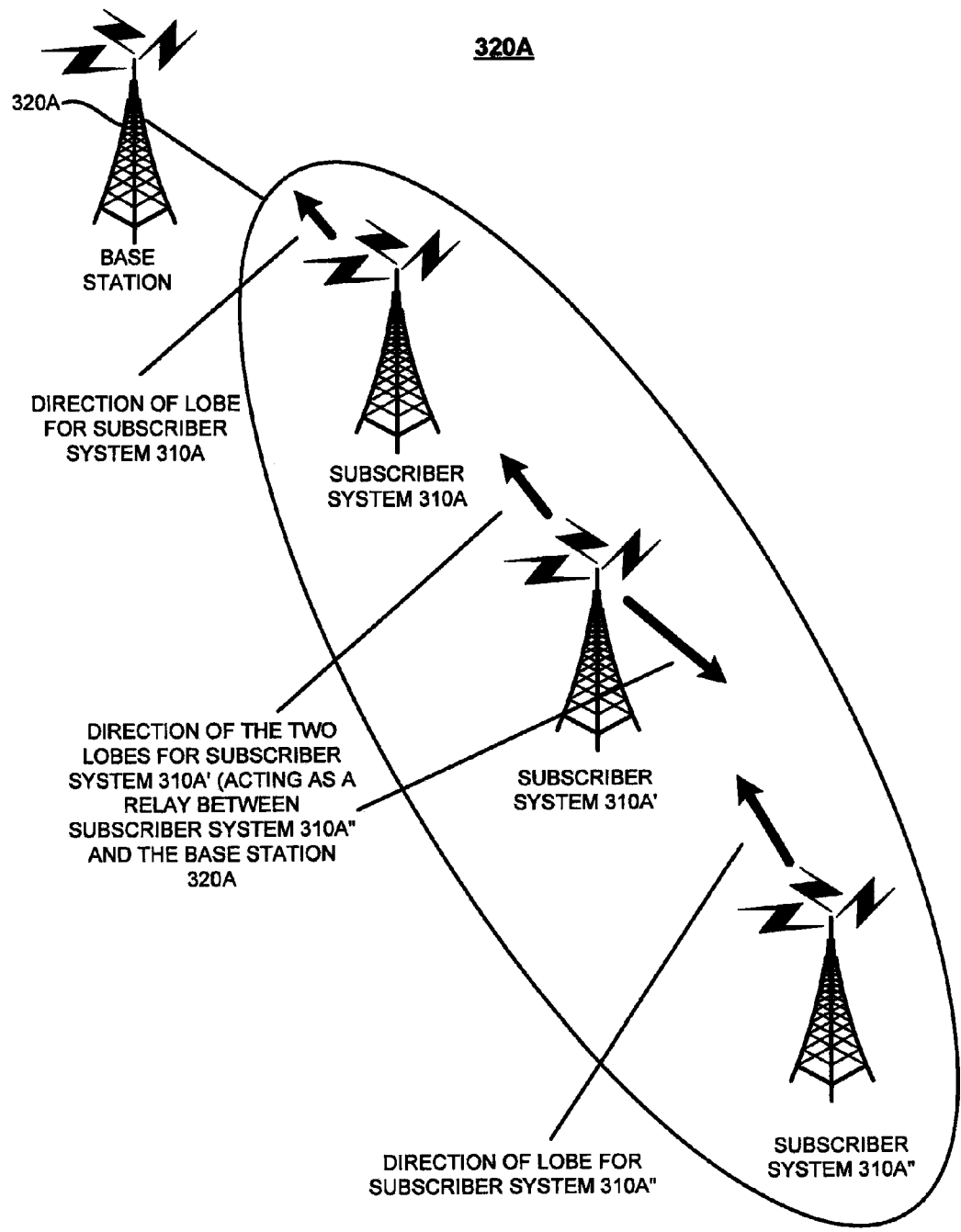
FIG. 3A illustrates a communications system where a subscriber system is configured to act as a relay so that another subscriber system may access a base station using the relay.

Referring to FIG. 3A, a communications system 300A illustrates how a subscriber system may act as a relay for another or multiple other subscriber systems. Specifically, the lobes for subscriber systems 310A, 310A', and 310A" may be used to enable subscriber system 310A" to access base station 320A through subscriber system 310A'.

In FIG. 3A, the subscriber system 310A' includes two lobes. The two lobes may result from using a bipolar antenna, whose lobes may be adjusted. Alternatively, subscriber system 310A' may include multiple antennas and/or receiving systems, tuned or directed as described with respect to FIGS. 1 and 2.

One of the two lobes for subscriber system 310A' acts as a relay for subscriber system 310A". For example, subscriber system 310A" may be unable to directly communicate with the wireless base station 320A. However, if the subscriber system 310A' acts as a relay, the subscriber system 310A" may use the subscriber system 310A' to access the wireless base station 320A.

Figure 3B:
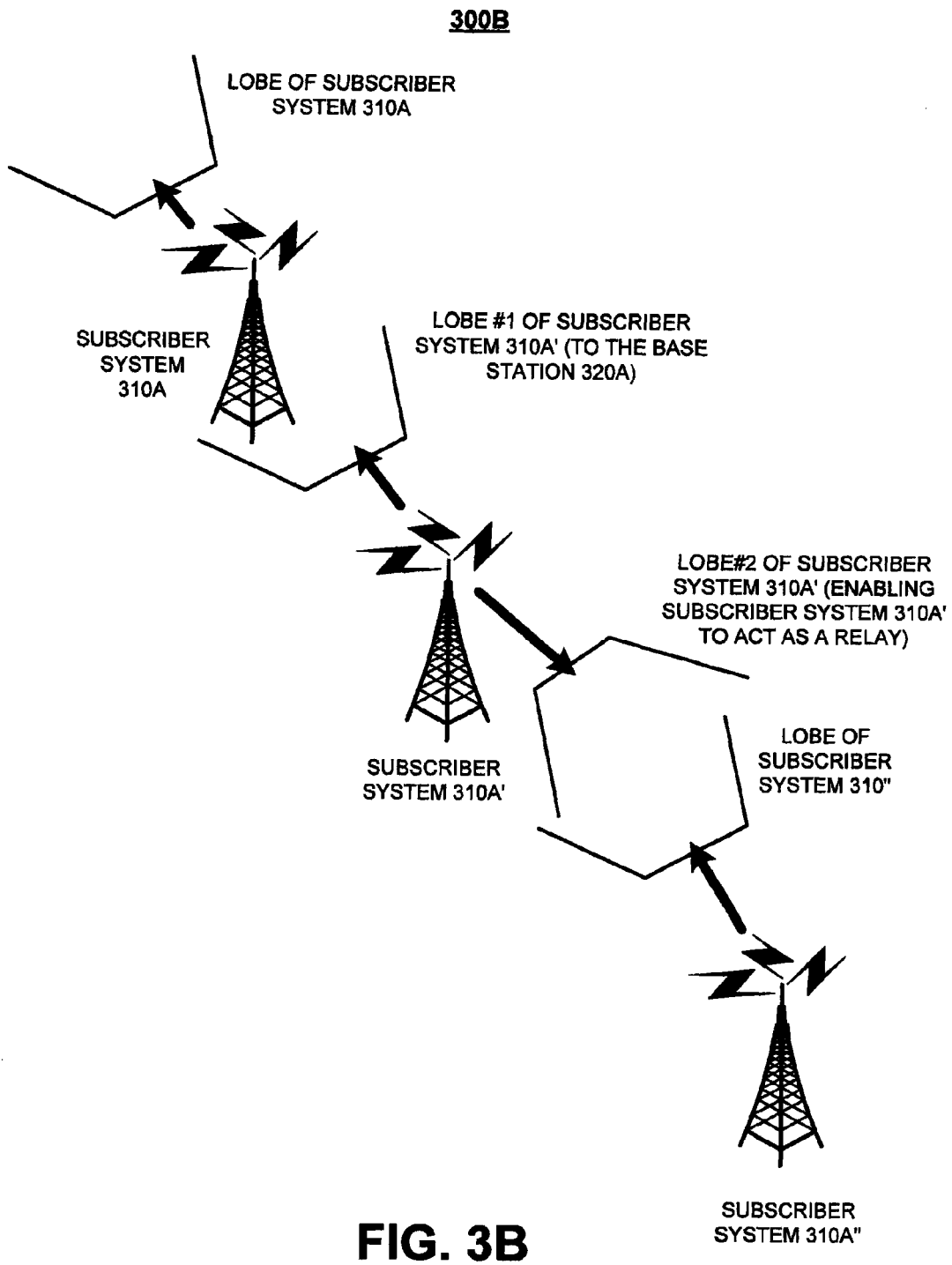
FIG. 3B illustrates an exemplary process by which a subscriber system uses multiple lobes to act as a relay for other subscriber systems.

Referring to FIG. 3B, the lobes of three subscriber systems are shown. Generally, FIG. 3B relates to the FIG. 3A in that both FIGS. 3A and 3B illustrate the how a subscriber system's lobes may be orientated. However, FIG. 3B illustrates how the range of a subscriber system may limit which other subscriber systems the subscriber system will communicate. The limit on range may lead to one subscriber system acting as a relay for the other subscriber system. The lobes of subscriber system 310A are oriented so that its energy is directed toward an intended destination or intermediary to an intended destination, for example, a wireless base station (not shown) or intermediary relay. Depending on the distances, protocols, signal strengths, and frequency, when the lobe of subscriber system 310A does not cover subscriber system 310A', subscriber system 310A may not be able to directly communicate with any subscriber system 310A'. Instead, the two devices might need to communicate through a wireless base station. In another example, subscriber system 310A may directly receive communications from subscriber system 310A', but may nevertheless require transmissions directed to subscriber system 310A to be routed through a base station.

Even when a subscriber system directly communicates with the base station, the subscriber system may maintain ongoing communications with the base station. A subscriber system may be asked to act as a relay for other subscriber systems. In another example, information from the subscriber system may be used to update the state table that is used to mange the wireless network (e.g., in centrally-managed, distributed or hybrid configurations). Furthermore, traffic utilization information may be used to reorient an antenna or configure lobe pools to segment congested lobe pools.

The wireless network may maintain an asynchronous configuration. Stated differently, some subscriber systems may have more detailed information describing the state of the wireless network. For example, as is shown in FIG. 3B, the subscriber system 310A" may not be aware of the base station 320A or the subscriber system 310A, while the subscriber system 310A' may be aware of both of these systems. Notwithstanding the differences in knowledge and whether the subscriber system has "discovered" the other subscriber systems, the subscribers systems may still participate in the wireless network.

In one implementation, the subscriber system 310A' may act as a proxy in filtering wireless state information to other subscriber systems. The subscriber system 310A' may filter topology information to the subscriber system 310A" so that the routing topology does not grow larger in size. Similarly, the subscriber system 310A' also may or may not advertise the existence of the subscriber system 310A" to other devices in the wireless network, or the subscriber system 310A' may advertise that it is a relay for other subscriber systems without identifying the particular subscriber systems that are supported.

Because of the asynchronous matrix/grid system in which nodes may discover other nodes, subscriber systems in the lobes of other systems may use this knowledge to better communicate. For example, if subscriber system 310A knows when subscriber system 310A' is transmitting because subscriber system 310A lies within the lobe subscriber system 310A', subscriber system 310A may elect to transmit during time allotted for subscriber system 310A'. Through this capability, the network may be operated more efficiently.

More specifically, the subscriber system may transmit a bandwidth request or requirement to the base station. The base station (or another system managing the configuration of the wireless network) may receive the request and allocate bandwidth in response. For example, a first subscriber system may be associated with a premium service and the traffic from the first subscriber system may take precedence over other communications from other subscriber systems. The premium identifier may relate to the nature of the traffic that is being transmitted (e.g., time sensitive real-time video) or the premium identifier may relate to the status of the operator of the subscriber system, for example, a preferred customer. Another example of a prioritized subscriber system may include a subscriber system acting as a relay for other subscriber systems.

Figure 4:
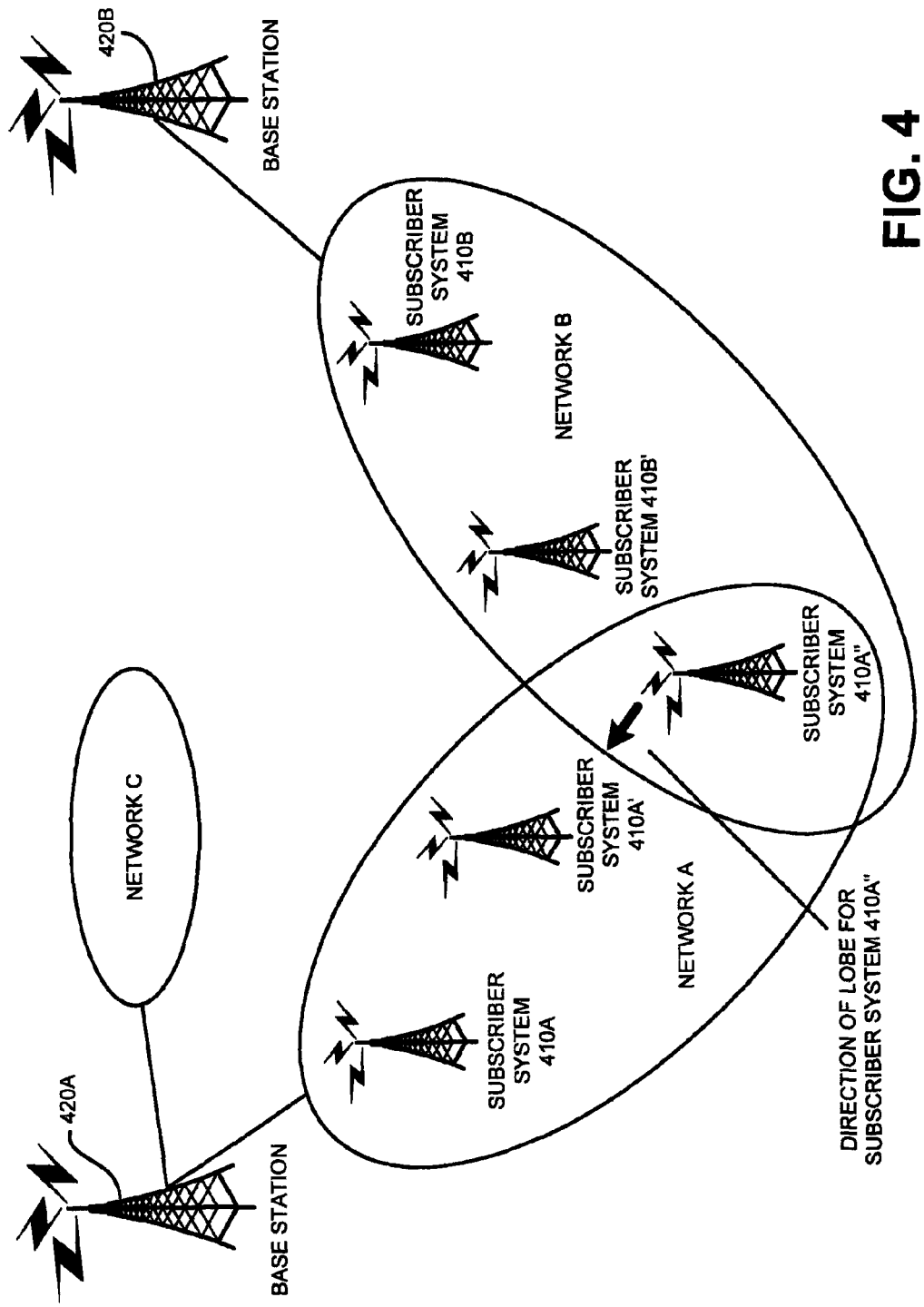
FIG. 4 illustrates a subscriber system that may selectively participate in one of several networks based on the state of the wireless network.

Guaranteeing or reserving bandwidth also may be allocated based on the order in which the request was received. For example, the requirements of the first subscriber system to request reserve bandwidth may be preserved over the bandwidth requirements of requests that are received later. Another bandwidth management scheme may use a relative priority system where a user that requests prioritized bandwidth may receive the reserved or prioritized bandwidth until their timer expires. Upon the expiration of the timer, another user may receive the prioritized designation or reserved bandwidth. Referring to FIG. 4, a wireless topology 400 is shown for a wireless network such as that shown by FIG. 1. The topology 400 includes base stations 420A and 420B that exchange information with subscribers, 410A, 410A' and 410A", 410B and 410B'. As is shown, base station 420A supports subscribers 410A, 410A' and 410A" in a network A, while base station 420B supports subscribers 410B, and 410B' in a network B, which may be physically or logically distinct from network A. As shown, node 410A" is within range of base station 420A" and base station 420B. However, it is initially configured to communicate within network A rather than network B. Thus, even though subscribers 410B' and 410A" may be located in close proximity to one another, through the use of sectorization, both subscribers are able to transmit simultaneously using the same frequency, as long as they communicate using non-overlapping nodes or using other bandwidth allocation techniques (e.g., CDMA, TDMA).

Subscriber 410A" may participate in either network A or B. As is shown in FIG. 4, subscriber 410A" is initially configured to communicate over network A, through the orientation of its lobe to participate in network A, which reduces interference with network B. However, if network A experiences difficulties (e.g., an outage or congestion through high utilization or if network B subscribers have a communication need), subscriber 410A" could communicate over network B. One example of network B subscribers having a communications need is a subscriber system in network B transmitting data to a subscriber system in network A (e.g., the subscriber system 410A'). Alternatively, if the base station 420B failed, the subscriber systems 410B and 410B' may use the subscriber system 410A" as a relay to access the base station 410A. Furthermore, due to its logical proximity to both networks, subscribe 410A" could be utilized as a relay between subscribers of network A and subscribers of network B. This is similar to the operations described previously with respect to buffer 210D of FIG. 2, where subscribers within a network may be configured to act as a relay for communications by other subscribers within the network.

Figure 5:
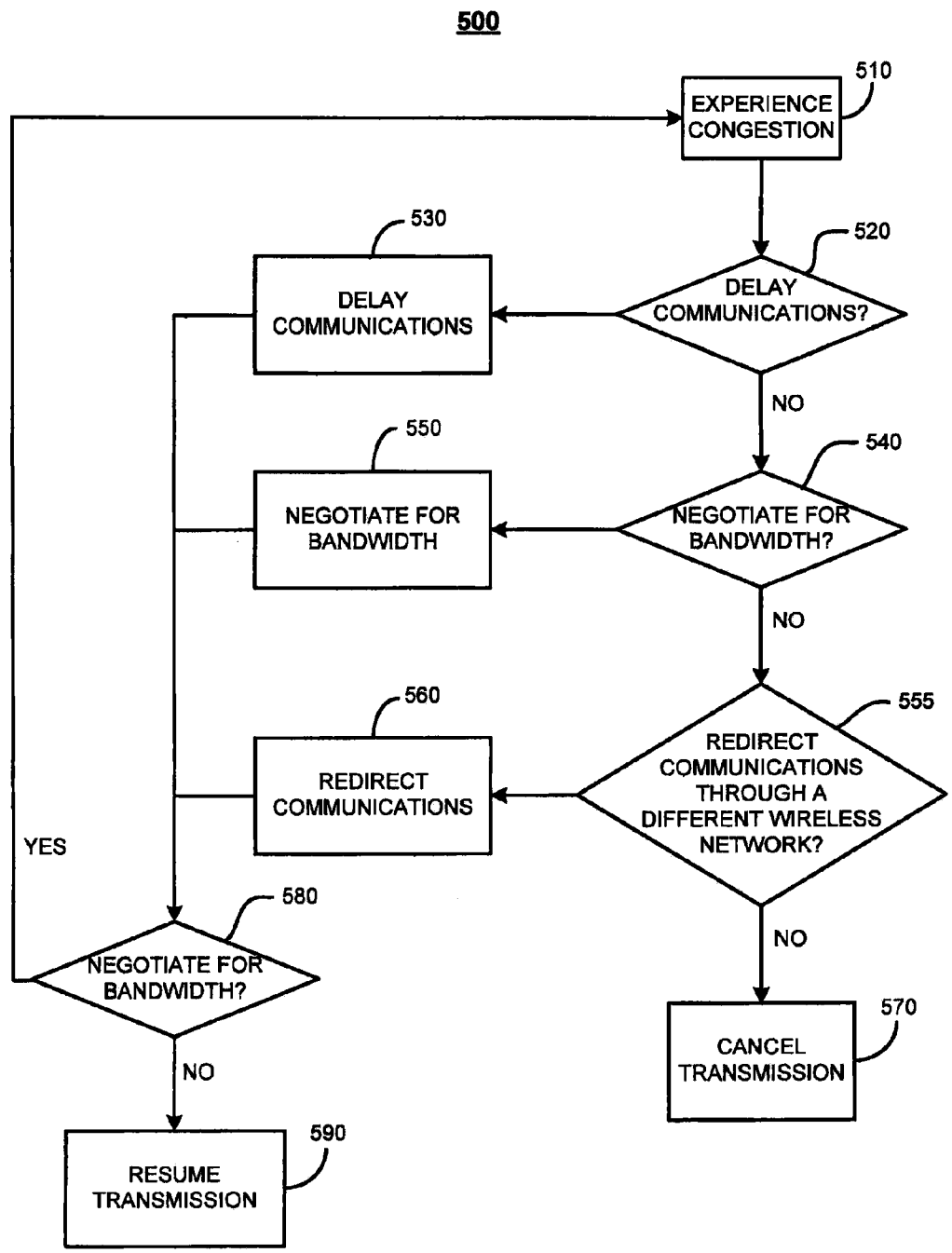
FIG. 5 is a flow chart illustrating an exemplary process by which a subscriber system may respond to congestion in a wireless network.

Referring to FIG. 5, a flow chart 500 is shown to describe how a subscriber may respond to congestion. Generally, the operations in flow chart 500 may used by the systems and operations described previously in FIGS. 1-4. For example, a subscriber system 100 participating in a wireless network by acting as a relay as shown in FIG. 3A may use flow chart 500 in processing a file request from the subscriber system served by the relay.

Initially, the network/node experiences congestion or otherwise requires re-configuration (step 510), and determines a response to the existing or anticipated congestion. The node may detect existing or anticipated congestion in several manners. For instance, a wireless controller may determine that the transmission channel is unavailable (e.g., because of noise, interference, or lack of channel capacity). Alternatively, the node may receive a scheduling message indicating that the node needs to reduce bandwidth consumption, presently or in the future, or the node may detect periodic or otherwise predictable network usage patterns.

In any event, in response to such a condition, the node determines whether to delay the communication (step 520). If so, the communications may be delayed. This may be an automatic response, similar to CSMA/CD, which is typically the case if there is unexpected burst traffic. However, in the case of sustained or predicted/predictable future congestion which results in a contention for bandwidth, a more rigorous response may be required.

When the communications cannot be delayed, the node may interface with the wireless network to determine whether bandwidth can be acquired through negotiation (step 540). For example, the node may request a larger time block in which to transmit. Other nodes may react to accommodate such a request or they may respond with information to allow the requesting node to redirect their communication to a more available network. If bandwidth can be acquired through negotiation, the subscriber system negotiates for bandwidth (step 550). For example, a subscriber system may relinquish some allocated bandwidth so that a neighboring subscriber system may receive a video-on-demand stream. As a third option, the node may attempt to redirect the communications through a different network (step 555). For example, the node may determine whether the antenna can be adjusted to participate in a different network. If another wireless network exists that provides access to a network with better conditions, the node may stop participating in the one network and elect to join the other network (step 560). Redirecting the subscriber system may include identifying a particular subscriber system as the source of congestion or transmission difficulties, and purposefully redirecting that subscriber system, or conversely, purposefully maintaining that identified subscriber system within the network and redirecting one or more other subscriber systems that are not the source of the congestion.

In one example, the node may interface with the wireless base station controller to determine whether a better or more available network exists. The wireless base station controller may access a state table describing conditions for several networks so as to provide the node with information regarding the appropriate/optimal network or node to access. The wireless base station controller may incorporate a geographic database to provide more accurate network information. For example, the wireless base station controller may access a geo-location database that correlates billing addresses with positioning information to determine which base station lobes are accessible.

If none of the operations can be performed, the transmission may be cancelled (step 570). For example, a subscriber system may be instructed that a video-on-demand transmission may not be supported based on the state of the network. If a corrective action has been performed, the subscriber system may determine if there is still congestion in the wireless network (step 580). If so, the transmission may be resumed (step 590). If not, the subscriber system revisits the operations described previously to determine if the congestion may be reduced.

Although the operations in FIG. 5 are shown in a sequential flow chart, one or more of the operations may be performed in parallel or in a different order. For example, as a communication is being considered, a subscriber system may initially determine if the communications may be redirected through a different wireless network. If the communications may not be redirected, the subscriber system then may act in parallel to determine if the communications may be delayed and also if the bandwidth may be secured through negotiation.

The wireless base station controller also may incorporate information about one or more other subscriber systems that may be used as relays. Although the term base station controller is used to describe the system that accesses network information for one or more subscriber(s), implementations of the wireless base station controller may include programs running on other subscriber systems to determine whether the subscriber system should act as a relay.

Furthermore, either of a base station or a master node (e.g., a system or program that manages multiple base stations) may reduce the transmission window for users to accommodate an increased number of users.

Although access to a central controller is described, the subscriber system may determine for itself the availability of one or more other wireless networks to access. For example, the subscriber system may adjust its lobes to probe the state of other networks and devices accessible to the repeating system.

Figure 6:
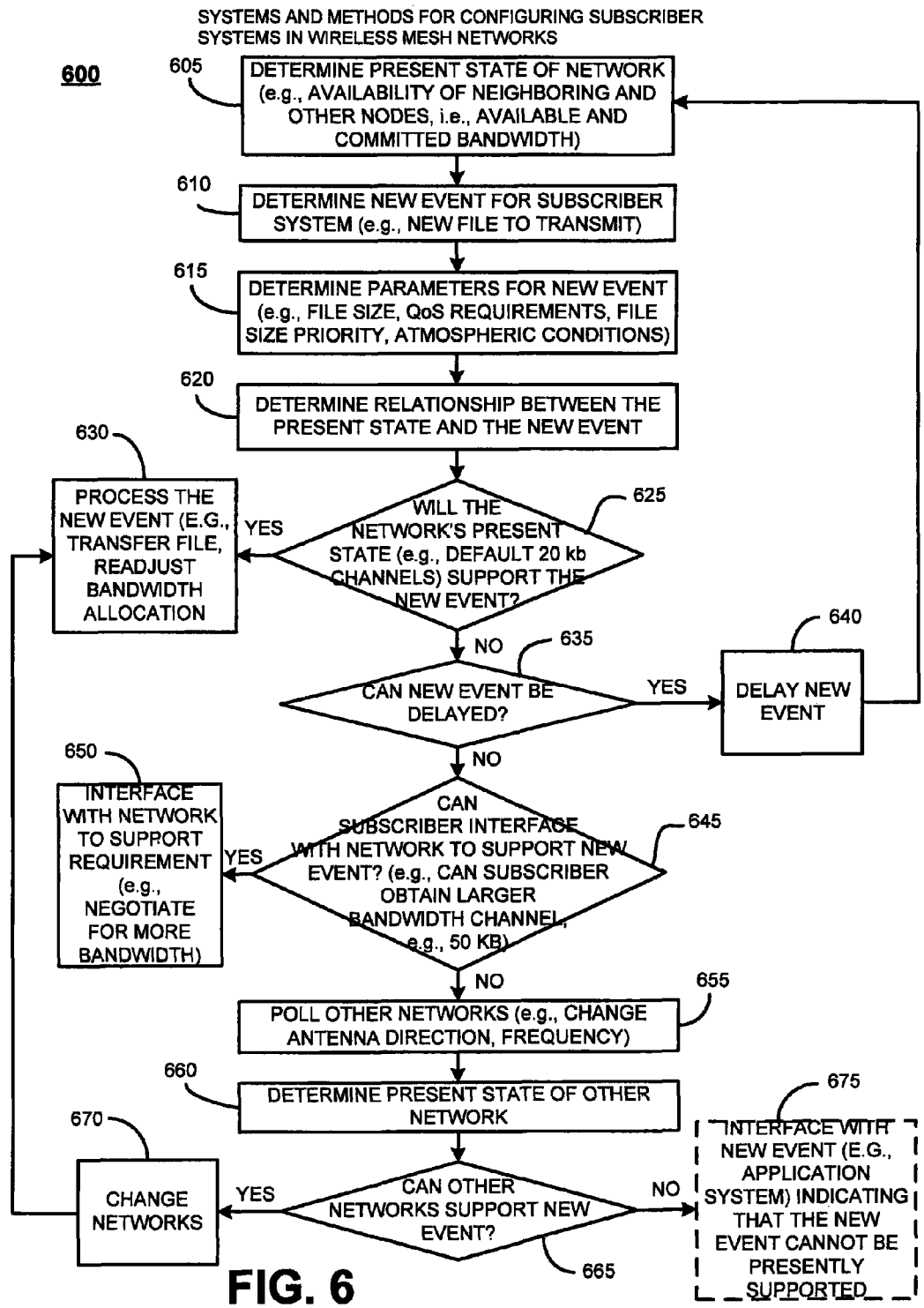
FIG. 6 is a flow chart illustrating a process by which a wireless network may be managed.

Referring to FIG. 6, a flow chart 600 illustrates how a wireless network may be operated. More particularly, flow chart 600 describes how new events may be accommodated based on the current state of the wireless network. Generally, the operations described in flow chart 600 may be performed on the systems described previously in FIGS. 1-4.

Initially, the present state of a network is determined (step 605). Determining the present state of the network includes determining one or more values describing how the wireless network is operating. The values that are determined may include, but are not limited to, bandwidth criteria (e.g., overall capacity, utilization), environmental conditions (e.g., weather and transmission medium parameters), traffic information (e.g., priority), and/or subscriber information (e.g., location, priority). An example may include the wireless network detecting that the quality of wireless links is degrading, for example, due to a rainstorm.

The wireless network determines that a new event or state change for the wireless network has occurred or will be occurring (step 610). For example, a new subscriber system may be requesting to join a new time-sensitive VOD stream may be requested, or the environmental conditions may have changed. Parameters for the new event are determined (step 615). For example, the file size or transmission requirements requested by a subscriber system may be determined.

With the present state and the requirements for a new event determined, the wireless network determines the relationship between the present state and the requirements (step 620), specifically, whether the present state support the new event (step 625). If so, the wireless network processes the new event (step 630). Thus, the user may be added or the proposed traffic may be transmitted. If the present state cannot support the new event, the wireless network determines if the new event can be delayed (step 635). If so, the new event is delayed (step 640). If not, the wireless network determines if the subscriber system can interface with the wireless network to accommodate the new event (step 645). For example, the subscriber system may determine if the channel capacity can be increased for a user requesting a video stream without adversely affecting other communications or with an acceptable level of affect on other communications. If so, the subscriber system may interface with wireless network to accommodate the new event (step 650). Thus, the channel allocation scheme may be readjusted. If not, the wireless network may poll other networks to see if other wireless networks can accommodate the new event.

Alternatively, the other networks can be polled to see if existing network requirements could be transferred to the other wireless networks (e.g., lobes) (step 655). Specifically, the present state of the other network is determined (step 660). The present state of the other wireless network may include a subscriber count, a network utilization, an indication of the reserved/committed bandwidth, and/or the ability of the other wireless network to support additional subscribers. For example, if the other wireless network has subscriber systems located at a great distance from other subscriber systems, relative to the underlying wireless network format (e.g., 802.11(b)), the state of the other wireless network may describe the state of the other network to accommodate adding a new subscriber system at the location of the new subscriber system. If the other wireless networks can accommodate the new event, either by directly supporting the new event or transferring other requirements from the present wireless network to the other wireless network, the wireless network may be reconfigured to accommodate the new event by interfacing with the other wireless network (step 670). Interfacing with the other wireless network may include identifying a subscriber system to be transferred, instructing the identified subscriber system to join the other wireless network, and exchanging configuration information with the wireless network so that the identified subscriber may join the other wireless network. For example, a first lobe pool may be experiencing congestion. The base station supporting the first lobe pool may determine that although a first subscriber system is the source of the congestion, a second subscriber system should disconnect from the first lobe pool and join a second lobe pool. The base station may send the second subscriber system a message directing the second subscriber system to disconnect from the first lobe pool and providing configuration information (e.g., antenna orientation information) so that the second subscriber system may join the second lobe pool.

Depending on the wireless network and the operating environment, the wireless network then may activate an antenna to create the second lobe pool, or the wireless network may reorient an existing second lobe pool to better support the second subscriber system. For example, the antenna supporting the second lobe pool may be "steered" so that the lobe of the antenna enables communications with the second subscriber system. If not, the wireless network interfaces with the new event, for example, the requesting subscriber system indicating that the new event cannot be presently supported (step 675).

Alternatively, if there is no automated source for the new event, such as in the case of a rainstorm that interrupts wireless network operations, the wireless network may reconfigure its operations so that the wireless network may be operated in a limited capacity.

The operations described in FIG. 6 may be performed in a central or distributed fashion. For example, a management station may receive messages from the wireless base station and/or subscriber systems and generate a reconfiguration message in response to these systems that governs their behavior and operation. Alternatively, each participating node (e.g., subscriber system and base station) may determine for itself a configuration based on its own assessment of the wireless network. Finally, a hybrid approach may be used, such that a portion of the configuration is centrally determined, but a participating node may be allowed to determine its own operating configuration within a range specified by the central node.

Figure 7:
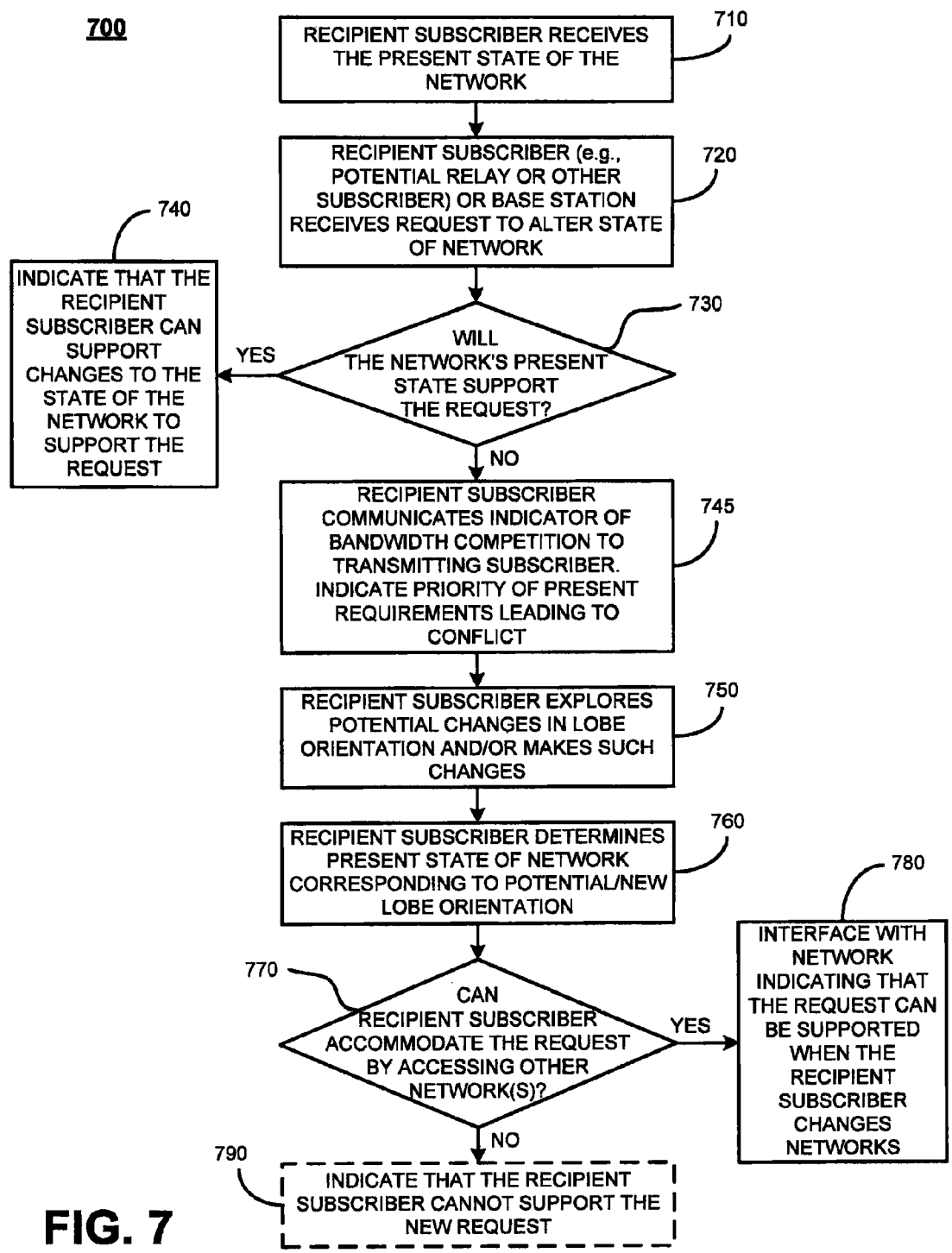
FIG. 7 is a flow chart illustrating a process by which a subscriber system may join and participate in a wireless network.

FIG. 7 is a flow chart 700 that shows how a subscriber may participate in a wireless network. Generally, the operations described in flow chart 700 relate to the systems and operations described previously with respect to FIGS. 1-6. However, flow chart 700 indicates how a subscriber system, hereinafter referred to as a recipient subscriber, may act as a gateway or a controller for other subscriber systems requesting to access other networks through the recipient subscriber.

Initially, the recipient subscriber receives the present state of the network (step 710). The recipient subscriber may receive a request to alter the present state of the network (step 720). For example, a new subscriber may request to use the recipient subscriber as a relay. It is determined whether the network can support the request (step 730). The recipient subscriber may determine if the relay path has adequate bandwidth to support the new subscriber. If so, the recipient subscriber indicates that the changes to support the request can be supported (step 740). If not, the recipient subscriber communicates an indicator of bandwidth competition to the transmitting subscriber (step 745). The recipient subscriber explores whether potential changes in lobe orientation or channel configuration would support the request (step 750). Thus, reducing allocated bandwidth may be explored. The state of the network under the new orientation/configuration is then determined (step 760), and the recipient subscriber determines whether the new orientation can support the request (step 770). If the new configuration can accommodate the request, the recipient subscriber interfaces with the wireless network to make such a change (step 780). If not, the recipient subscriber indicates that the recipient subscriber cannot support the new request.

A more detailed example of the operations described in FIG. 7 illustrates how a request for a video streaming event may be supported. Initially, a first subscriber system may be participating in a wireless network and exchanging status information with other subscriber systems and a base station (step 710). The present state of the network may be maintained in a state table residing on the first subscriber system (in addition to other state tables maintained on the other subscriber systems and the other base stations). The first subscriber system receives a request to act as a relay for a second subscriber system in supporting a video streaming event (step 720). The first subscriber system uses the state table to determine if the first subscriber system may act as a relay to support the second subscriber system (step 730). If the first subscriber system can support the streaming event, the first subscriber system indicates that the first subscriber system may support the second subscriber system (step 740). This may include sending messages to the second subscriber system and/or other subscriber systems indicating that the first subscriber system will act as a relay for the second subscriber system.

If the first subscriber system cannot support the second subscriber system, the first subscriber system indicates that the request cannot be supported and indicates the priority of the present requirements leading to the conflict (step 745). This may include a message indicating that the ambient traffic precludes the video event from being supported. The first subscriber system may analyze its state table to determine another lobe pool accessible to the second subscriber system that may support the video streaming event (step 750). The first subscriber system may simultaneously determine the state of the network corresponding to a potential or new lobe configuration (step 760). If the other networks indicate that the video streaming event can be supported (step 770), the first subscriber system may interface with the base station to transfer the second subscriber system to the new lobe pool (step 780). If the new lobe pool cannot support the second subscriber system, the first subscriber system may indicate to the second subscriber system that the video streaming event cannot be supported.

Although FIG. 7 shows a sequential sequence of operations, the operations shown in FIG. 7 may be performed in an alternate sequence and/or in parallel. For example, although determining whether the present state of the network will support the request is shown as occurring before determining whether other networks can accommodate the network request, other configurations may consider the present state of the network as the state of other networks is being considered. Although the present state of the network may indicate the present state of the network cannot support the present request, if the other networks are operating at even higher utilizations, the relative degree of congestion may determine whether the present state of the network can support the request. Although the wireless network may not be operating in a desirable range, performance may be acceptable relative to other wireless networks.

Other implementations are within the scope of the following claims. For example, although some operations have been described with respect to a base station or a subscriber system, a subscriber system may be configured to act as a base station. Thus, a subscriber system may support multiple other subscriber systems that use the subscriber system operating as a base station as a gateway. In another example, a subscriber system may be operating base station software running on a consumer appliance in a user's residence or place of business. The update period may be determined by the user's activity. If the user's device is not busy, the subscriber system may participate in more frequent updates. When the user's device is busy, the subscriber system may update the state of the network and/or other subscriber systems less frequently.

What is claimed is:

1. A method for operating a wireless network including a plurality of wireless subscriber systems, the method comprising:
receiving a request from one or more wireless subscriber systems;
receiving information regarding a state of the wireless network; and
responsive to the request and based on the information regarding the state of the wireless network, modifying at least one lobe pool of the wireless network such that the lobe pool includes one or more wireless subscriber systems outside of the lobe pool.

2. The method of claim 1, wherein the request includes at least one of a request to join the wireless network or a request for the wireless network to support a communication event.

3. The method of claim 1, wherein the information regarding the state of the wireless network includes at least one of:
an available bandwidth of at least one of the wireless network and the lobe pool;
traffic information associated with at least one of the wireless network and the lobe pool;
a number of wireless subscriber systems included in at least one of the wireless network or the lobe pool;
environmental conditions effecting at least one of the wireless network and the lobe pool;
locations of the wireless subscriber systems in at least one of the wireless network and the lobe pool; or
an indication of a new event to be supported by the wireless network.

4. The method of claim 1, wherein modifying at least one lobe pool of the wireless network includes performing antenna processing.

5. The method of claim 4, wherein performing antenna processing includes electronically tuning at least one antenna in the wireless network.

6. The method of claim 4, wherein performing antenna processing includes controlling a directional gain of at least one antenna in the wireless network.

7. The method of claim 4, wherein performing antenna processing includes controlling a direction of at least one antenna in the wireless network.

8. The method of claim 4, wherein performing antenna processing includes selectively activating multiple antennas in the wireless network.

9. The method of claim 1, further comprising:
identifying one or more wireless subscriber systems included in the lobe pool and the one or more wireless subscriber systems outside the lobe pool based on the information regarding the state of the wireless network, wherein modifying at least one lobe pool of the wireless network enables the one or more wireless subscriber systems outside of the lobe pool to communicate with the one or more wireless subscribers included in the lobe pool.

10. The method of claim 9, wherein identifying includes:
determining, based on the information regarding the state of the wireless network, potential configurations of the plurality of wireless subscriber systems in the wireless network; and
identifying the one or more wireless subscriber systems included in the lobe pool and the one or more wireless subscriber systems outside the lobe pool based on the potential configurations.

11. The method of claim 1, wherein modifying at least one lobe pool of the wireless network includes transmitting configuration information to one or more of the plurality of wireless subscriber systems.

12. The method of claim 1, wherein the wireless subscriber systems comprise least one of mobile devices, workstations, wireless base stations, and network hubs.

13. A method for operating a wireless network including a plurality of wireless subscriber systems, the method comprising:
receiving a request from one or more wireless subscriber systems;
receiving information regarding a state of the wireless network; and
responsive to the request and based on the information regarding the state of the wireless network, modifying at least one lobe pool of the wireless network such that the lobe pool excludes one or more wireless subscriber systems from the lobe pool.

14. The method of claim 13, wherein the request includes at least one of a request to join the wireless network or a request for the wireless network to support a communication event.

15. The method of claim 13, wherein the information regarding the state of the wireless network includes at least one of:
an available bandwidth of at least one of the wireless network and the lobe pool;
traffic information associated with at least one of the wireless network and the lobe pool;
a number of wireless subscriber systems included in at least one of the wireless network or the lobe pool;
environmental conditions effecting at least one of the wireless network and the lobe pool;
locations of the wireless subscriber systems in at least one of the wireless network and the lobe pool; or
an indication of a new event to be supported by the wireless network.

16. The method of claim 13, wherein modifying at least one lobe pool of the wireless network includes performing antenna processing.

17. The method of claim 16, wherein performing antenna processing includes electronically tuning at least one antenna in the wireless network.

18. The method of claim 16, wherein performing antenna processing includes controlling a directional gain of at least one antenna in the wireless network.

19. The method of claim 16, wherein performing antenna processing includes controlling a direction of at least one antenna in the wireless network.

20. The method of claim 16, wherein performing antenna processing includes selectively activating multiple antennas in the wireless network.

21. The method of claim 13, wherein the wireless subscriber systems comprise least one of mobile devices, workstations, wireless base stations, and network hubs.

22. An apparatus for operating a wireless network including a plurality of wireless subscriber systems, the apparatus comprising:
a communication device configured to receive, over the wireless network, a request from one or more wireless subscriber systems; and
a wireless controller configured to initiate, responsive to the request and based on information regarding a state of the wireless network, modification of at least one lobe pool of the wireless network such that the lobe pool includes one or more wireless subscriber systems outside of the at least one lobe pool or excludes one or more wireless subscriber systems from the at least one lobe pool.

23. The apparatus of claim 22, wherein the information regarding the state of the wireless network includes at least one of:
an available bandwidth of at least one of the wireless network and the lobe pool;
traffic information associated with at least one of the wireless network and the lobe pool;
a number of wireless subscriber systems included in at least one of the wireless network or the lobe pool;
environmental conditions effecting at least one of the wireless network and the lobe pool;

locations of the wireless subscriber systems in at least one of the wireless network and the lobe pool; or an indication of a new event to be supported by the wireless network.

24. The apparatus of claim 22, wherein the wireless controller is configured to initiate modification of the at least one lobe pool by initiating antenna processing in the wireless network.

25. The apparatus of claim 24, wherein the wireless controller is configured to initiate antenna processing by initiating at least one of:

electronically tuning at least one antenna in the wireless network;

controlling a directional gain of at least one antenna in the wireless network;

controlling a direction of at least one antenna in the wireless network; or selectively activating multiple antennas in the wireless network.

26. The apparatus of claim 22, wherein the wireless subscriber systems comprise at least one of mobile devices, workstations, wireless base stations, and network hubs.

27. The apparatus of claim 22, wherein the request includes at least one of a request to join the wireless network or a request for the wireless network to support a communication event.

* * * * *